United States Patent [19]

Okano

[11] 4,178,611

[45] Dec. 11, 1979

[54] OPTICAL LOW PASS FILTER

[75] Inventor: Yukio Okano, Izumi, Japan

[73] Assignee: Minolta Camera Kabushiki Kaisha, Osaka, Japan

[21] Appl. No.: 889,011

[22] Filed: Mar. 22, 1978

[30] Foreign Application Priority Data

Mar. 26, 1977 [JP] Japan .................................. 52-33784

[51] Int. Cl.² ............................................. H04N 9/06
[52] U.S. Cl. ....................................... 358/44; 358/55; 350/162 SF
[58] Field of Search .............. 358/44, 55; 350/162 SF

[56] References Cited
U.S. PATENT DOCUMENTS 3,821,795 6/1974 Okano ............................ 350/162 SF Primary Examiner—Robert L. Richardson
Attorney, Agent, or Firm—Jackson, Jones & Price

[57] ABSTRACT

An optical low pass filter adapted for use in a single or double tube color television camera provided with an optical system including a color encoding filter for obtaining color or chrominance signals having the spatial frequency in a particular band. The low pass filter serves to cut off the high spatial frequency components of the image or luminance signals to eliminate the crosstalk between the chrominance and luminance signals. The low pass filter according to the present invention is a phase grating filter having the triangular-wave cross-sectional configuration, of which height is in a range given by a mathematical description.

12 Claims, 9 Drawing Figures

OPTICAL LOW PASS FILTER

BACKGROUND OF THE INVENTION (1) Field of the Invention

The present invention relates to an optical low pass filter to be used in an optical system for a single or double tube color television camera including a color encoding filter for obtaining chrominance signals.

(2) Description of the Prior Art

There have been proposed and known various types of optical low pass filters in the prior art which are used in the single or double tube color television camera for eliminating cross-talk between the luminance and the chrominance signals by separating the spancial frequency band in which these signals lie. One example of the filters is a rectangular-wave phase grating filter which can provide a signal low pass effect without a substantial loss of light during the transmission, see for example, U.S. Pat. No. 3,681,519, U.S. Pat. No. 3,756,695 and U.S. Pat. No. 3,821,795. This type of low pass filter can provide OTF (Optical Transfer Function) characteristics wherein the OTF value is reduced over a substantial range of the spatial frequency as shown by line A in the attached FIG. 1. However, it has a disadvantage that the OTF value linearly decreases with the spatial frequency, resulting in low OTF values at lower spatial frequency range i.e. the band of the frequency higher than the cut-off frequency (also see line A in FIG. 1), consequently the image of an object obtained through the filter has not desirable contrast and sharpness.

The prior art has also used double refraction or birefringent plates such as shown in U.S. Pat. No. 3,588,224 which discloses application of the birefringent plate as an optical low pass filter. This type of optical low pass filter has comparatively high OTF values at the lower spatial frequency range. However, the OTF characteristics obtained through the birefringent low pass filter is such as shown by the broken line B in FIG. 1. That is, the OTF value decreases at a specific spatial frequency but not over a desirable wide range of the spatial frequency.

Accordingly, the primary object of the present invention is to provide an improved optical low pass filter having the joint advantages of both the rectangular-wave phase grating type and the birefringent type filters. Another object of the present invention is to provide an optical low pass filter having an OTF characteristic wherein the OTF value is substantially high at the lower frequency range i.e. in the band shared for the luminance signals and is reduced or cut-off over a desirably wide range in the band of the spatial frequency higher than the cut-off frequency, i.e. the band to be shared for the chrominance signals. To accomplish these objects, the present invention adopts a triangular-wave phase grating filter.

To use a triangular-wave phase grating as the optical low pass filter for a single or double tube color television camera, has been proposed in U.S. Pat. No. 2,733,291 and aforesaid U.S. Pat. No. 3,821,795. However, as such prior proposals directed an attention to or suggested utilization of only the refraction effect at the inclined surfaces of the triangular-wave grating, it has been believed that the OTF characteristics obtained are substantially the same as is obtained by the birefringent filter, i.e. as shown by B in FIG. 1, and that the triangular-wave phase grating can not provide reduction of the OTF value over a wide range. In addition, manufacturing of the triangular-wave phase grating filters of expected configurations has been difficult. Thus, the triangular-wave phase grating optical low pass filter has not been brought into practice.

SUMMARY OF THE INVENTION

The present invention contemplates to obtain a high quality and practical phase grating low pass filter based on the inventor's new finding that the triangular-wave phase grating will have the OTF characteristic required for an optical low pass filter for a single or double tube color television camera if the height of the triangular wave is within a certain particular range.

The range is given by a following inequality:

$$\left| \frac{0.75\lambda}{2(n-n')} \right| \leq d \leq \left| \frac{1.45\lambda}{2(n-n')} \right|$$

wherein $\lambda$ = wavelength of light passing through the grating
$n$ = refractive index of the filter material
$n'$ = refractive index of the medium
$d$ = height of each triangular-wave According to the finding, the triangular-wave phase grating with the height d of each triangular wave given above can provide an OTF characteristic wherein the OTF value is high in the lower range in the luminance signal band and reduced over a wide range in the band to be shared for the chrominance signals.

The objects and features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIG. 4 is a diagram showing optical transfer function characteristics of the triangular-wave phase grating with a parameter of .

DETAILED DESCRIPTION OF THE INVENTION

(1) General Discussions

Figure 2A:
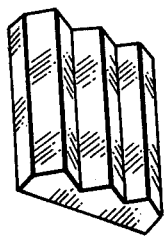
FIG. 2(a) is a fragmentary perspective view of one embodiment of the present invention.
Figure 2B:
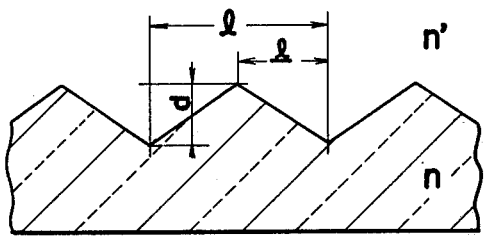
FIG. 2(b) is a schematic cross-sectional view of the embodiment shown in FIG. 2(a).
Figure 3:
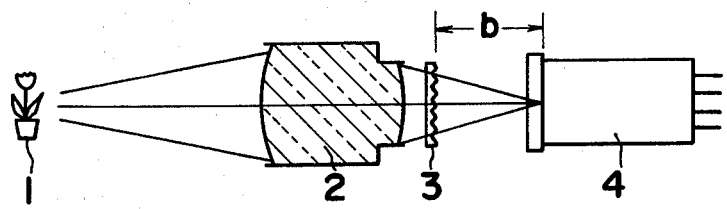
FIG. 3 is a schematic illustration showing an arrangement of the low pass filter according to the present invention in a single tube color television optical system.

Referring to FIGS. 2(a), 2(b) and 3 showing the first embodiment of the present invention, an optical filter 3 having the configuration as shown in FIGS. 2(a) and 2(b), is disposed between an image pick-up tube 4 and an objective or converging lens 2 which forms an image of an object 1 on a photosensitive surface of the tube. It is to be understood that, though not shown in the Figure, the single tube color television optical system shown in FIG. 3 contains a color encoding filter, which may attached to the face plate, as is well known in the art. In FIG. 2(b), the symbol 1 designates the pitch of the triangular wave, while d is the height of the triangular wave, n is the refractive index of the filter material, and n' is the refractive index of the medium, such as air, bordering on the surface of the grating.

In case the triangular-wave phase grating is disposed in a single tube color television optical system in the manner as shown in FIG. 3, the intensity distribution of the image of a line obtained through the grating is given by following formula:

$$C_m^2 = \left| \frac{m\pi \sin m\pi}{(\delta - m\pi)(\delta + m\pi)} + i \cdot \frac{\delta(\cos m\pi - e^{i\delta})}{(\delta - m\pi)(\delta + m\pi)} \right|^2 \quad (1)$$

wherein $$\delta = (2\pi/\lambda)(n - n')d \quad (2)$$

$m = 0, \pm 1, \pm 2$ $\lambda$ is the wave length of the light passing through the grating $\delta$ is phase difference of the light due to the grating On the other hand, the extension of the image of a line depends on the pitch 1 and the distance b between the grating and the image plane, wherein b is the value as measured in the air. The image will be a spectrum having the intensity distribution at every $1/\lambda b$ as a function of the value obtained by the formula (1) with integers being inserted for m.

The optical transfer function characteristics of the optical system of FIG. 3 with the triangular-wave phase grating 3 disposed as shown in the Figure, is obtained through Fourier tranformation of the intensity distribution of the image of a line according to the formula (1). The invention of the present application calculated and analyzed the optical transfer function characteristics for various values of $\delta$ as a parameter. As the result, it was found that triangular wave phase gratings having the value of $\delta$ within the following range will provide an OTF characteristics wherein the OTF value is high in a lower range and reduced over a wide range or extension of spatial frequency in the band to be shared with the chrominance signal.

$$0.75\pi \leq |\delta| \leq 1.45\pi \quad (3)$$

Figure 4:
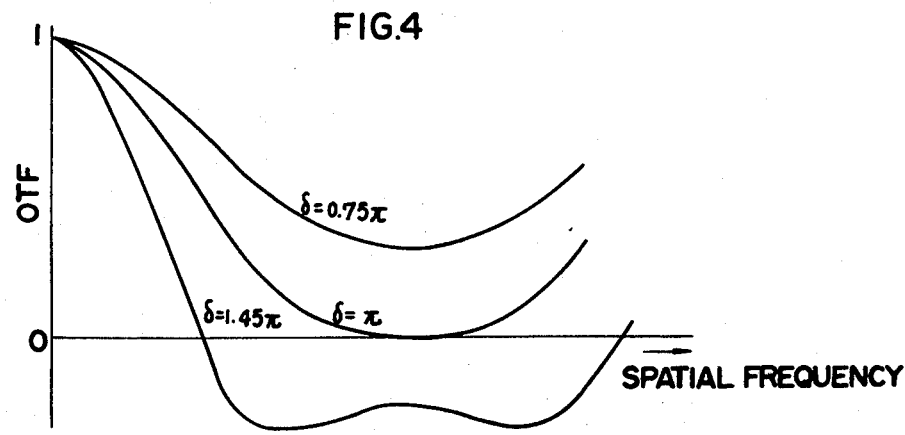

In other words, the above-mentioned triangular wave phase can provide substantially a wide cut-off frequency range as well as a comparatively high OTF value for the luminance signal band as shown in FIG. 4. If $|\delta|$ is smaller than $0.75\pi$, the cut-off characteristics will be insufficient. If $|\delta|$ is larger than $1.45\pi$, the OTF value will be large in negative value for a substantial range of the spatial frequency so that the grating will come to show geometric optical characteristics, i.e. the characteristics as a birefringent plate with which false color signals will be produced remarkably when it is used as the low pass filter in the color television optical system.

The above inequality for $|\delta|$ can be converted to an inequality for the height d of the rectangular wave, as follows:

$$\left| \frac{0.75\lambda}{2(n - n')} \right| \leq d \leq \left| \frac{1.45\lambda}{2(n - n')} \right| \quad (4)$$

This last inequality defines practically available range of the height d of triangular wave of the triangular wave phase grating filter for the later to be used as an optical low pass filter for the single or double tube color television camera.

(2) Example I

Figure 1:
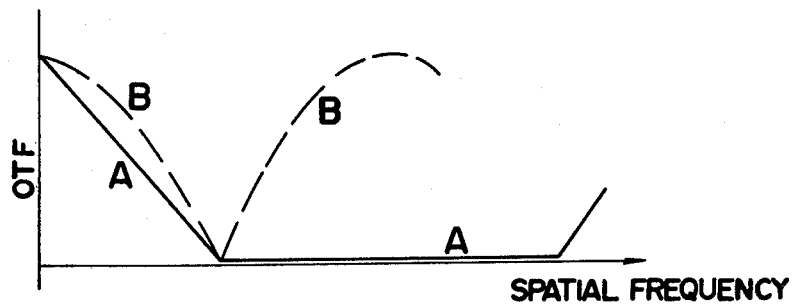
FIG. 1 is a diagram showing optical transfer function characteristics of conventional optical low pass filter.
Figure 5:
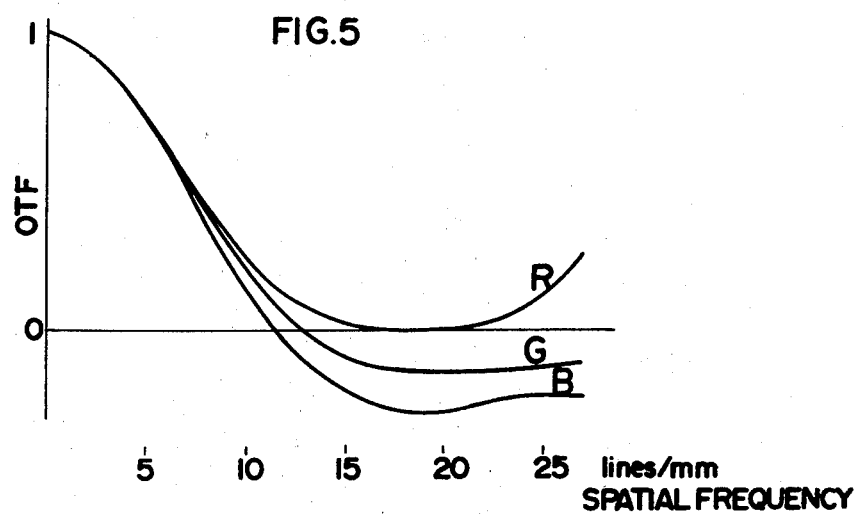
FIG. 5 is a diagram showing optical transfer function characteristics for three colors, of an embodiment of the present invention.

In the first example, the low pass filter has the configuration as shown in FIGS. 2(a) and 2(b) and disposed in the color television optical system in the manner as shown in FIG. 3, with the parameters of interest being that n=1.491, n'=1 (i.e. the filter is in the air), d=0.641μ, 1=0.6 mm and b=26 mm as measured in the air. The OTF characteristics of optical system of the first example are as shown in FIG. 5, for the blue, green and red lights respectively having wave lengths of 0.45μ, 0.54μ and 0.63μ. As may be clear from the Figure, the OTF value is cut-off in the range between 12.5 lines/mm and 30 lines/mm of spatial frequency which range is wide enough in comparison with the birefringent plate. (cf. FIG. 1). Further, the OTF characteristic curves are upwardly convex, which means that the OTF values are high in the lower frequency range in comparison with the OTF value of the line A in FIG. 1. In the above example, the value of $\delta$ for the light of $\lambda = 0.54\mu$ is 1.17.

(3) Example II

Figure 6:
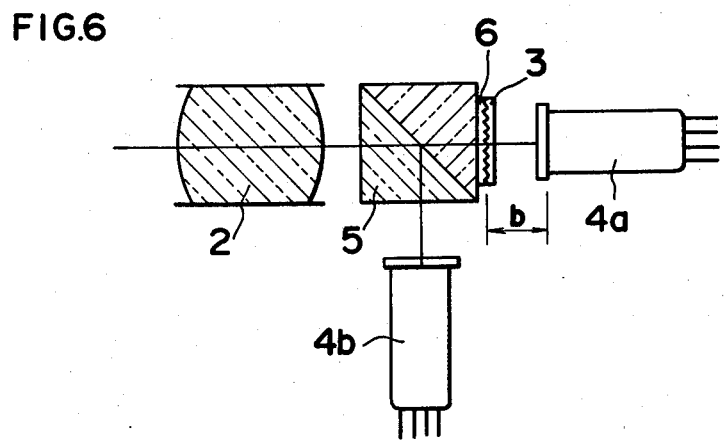
FIG. 6 is a schematic illustration showing an arrangement of an optical low pass filter according to the present invention, in a double tube color television optical system.

The second example is, as shown in FIG. 6, adapted for a double tube color television camera with the triangular-wave phase grating filter according to the present invention being cemented to a back surface of a light splitter prism 2. The optical system for the second example includes an objective 2 and a light or beam splitter prism for splitting the light from the objective into two beams emitted therefrom at a g right angle with each other and impinging respectively on image pickup tubes 4a and 4b. The tube 4a includes a color encoding filter to detect color or chrominance signals while the tube detects image or luminance signals only. The triangular-wave phase grating filter 3 is cemented on the rectangular wave side by a transparent cementing or bonding material 6 having the refractive index (n') of 1.565. In this example, d=15.2 mm, 1=0.12 mm, d=4.253μ and n=1.491 in order that the low pass filter may cut-off the spatial frequencies higher than 4 lines/mm.

(4) Modification and Variation

Although the above explanation has dealt with the triangular wave phase grating filter made of transparent material (refraction type) the filter may be of the reflection type having a refractive layer, for example of aluminium, coated over the surface of the triangular wave grating. In this case, the height d may be halved in comparison with the case of transparent, i.e. refractive type filter.

Figure 7:
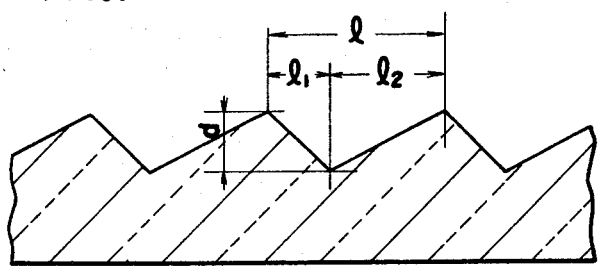
FIG. 7 is a schematic cross-sectional view of an optical low pass filter according to the present invention for the explanation of asymetry of the triangular-wave.

In addition, both inclined side surfaces of each triangle need not be symmetric but may be asymmetric as shown in FIG. 7 wherein $l_1$, and $l_2$ are respectively the widths of the inclined side surfaces. Let's define asymmetry coefficient K as follows:

$$K = l_1/l_2$$

Figure 8:
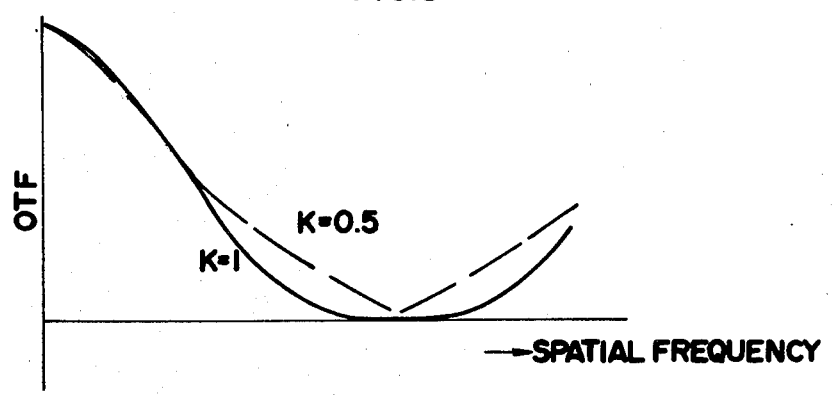
FIG. 8 is a diaphragm showing optical transfer function characteristics of an asymmetric triangular wave phase grating filter as an embodiment of the present invention.

FIG. 8 shows the OTF characteristics with a parameter of the asymmetry coefficient. From the Figure, it will see that the triangular wave phase grating of the asymmetric type functions as a low pass filter providing cut-off characteristics substantially the same as that of the symmetric type, if $0.5 \leq K \leq 2.0$. It is to be understood here that $K=0.5$ is substantially the same as $K=2.0$, because they are in the relation of mirror images. In other words, $K=0.5$ means that the ratio of widthes of the inclined surfaces is 1:2 while $K=2.0$ means that the ratio is 2:1. Thus, if the surfaces are replaced with one another, the two cases are converted to one another. The characteristic curves of FIG. 8 were obtained for $\delta=\pi$ for the both curves wherein $K=1$ and $K=0.5$ (i.e. $K=2.0$). The above discussion of the asymmetry has a significant meaning that the low pass filter according to the present invention is not necessary be exactly symmetric. In other words, the inequality for K provides available tolerance for the asymmetry of the triangular wave configuation upon manufacturing of such filters. Thus it may be well said that the optical low pass filter according to the present invention is suitable for mass production.

Figure 9:
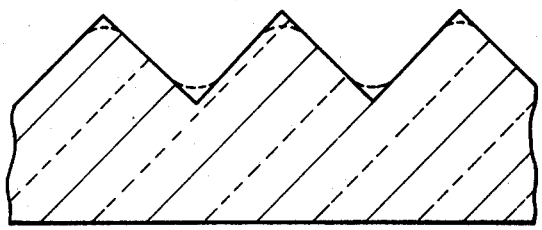
FIG. 9 is a schematic cross-sectional view of a modification of an optical low pass filter according to the present invention.

Further, it is not necessary for the triangular phase grating of the present invention to have acute ridge and valley lines but the ridge and valley portions may be somewhat rounded or dull as shown by broken lines in FIG. 9. In this case, only the intensity of defracted light at high demension will be diminished, and substantially the same cut-off characteristics as that of standard or ideal triangular wave phase grating as shown in real line in FIG. 9 will be obtained, so far as the height d is within the range as defined by the formula (4). In practice, it is difficult to obtain optical low pass filters of the perfect triangular wave configuration. Thus the above mentioned permissiveness for dullness of the ridge and valley portions is also effective for the mass production.

The triangular wave phase grating filters according to the present invention can be manufactured easily and at low cost for example through following process. At first, as has been done upon making ordinary diffraction filters, many fine lines are marked on a metal plate at a given pitch with a cutting tool having a cutting edge of a given angle to form many linear fine gooves, having substantially V shape in cross-section, on the metal plate. Then the marked configuration on the metal plate is transfered to a plastic optical material, such as polymethyl methyacrylate and the like. In other words, the low pass filter are molded from the plastic optical material using the marked or engraves metal plate as the die.

It is further to be understood that the present invention is applicable not only to the one dimensional grating which has the triangular wave cross-sectional configulation with respect to one direction, but also to the two dimensional grating which has the triangular wave cross-sectional configuration with respect to two direction.

While the above embodiments have been disclosed as the best mode presently contemplated by the inventor, it should be realized that these examples should not be interpreted as limiting, because artisans skilled in this field, once giving the present teachings, can vary from these specific embodiments. Accordingly, the scope of the present invention should be determined solely from the following claims in which we claim.

What is claimed is:

1. In an optical system for a color television camera system including a spatial color encoding filter disposed in the light path of said optical system and serving to modulate at least two color images, the optical system comprising a photoelectric converting member for generating electrical signals corresponding to said images, an objective lens disposed in front of said photoelectric converting member to focus an image of an object thereon, and a phase grating filter member disposed between the object and said photoelectric converting member and having the configuration of a triangular wave in cross section taken along at least one direction, in which the height, d of the triangular wave is within a range defined by the following formula:

$$\left| \frac{0.75 \lambda}{2(n-n')} \right| \leq d \leq \left| \frac{1.45 \lambda}{2(n-n')} \right|$$

wherein
n = refractive index of the filter material,
n' = refractive index of the medium bordering the surface of the grating, and
λ = wave length of the light affected by passing through the filter member.

2. An optical system as in claim 1, wherein the ratio K of widthes of adjacent side surfaces of each rectangle in the wave is given as follows:

$$0.5 \leq K \leq 2.0.$$

3. An optical system as in claim 1 wherein the phase grating is one dimensional with the ridge and valley portions of the grating having a curvilinear configuration.

4. An optical system as in claim 2 or 3 wherein the filter member is transparent.

5. An optical system as in claim 1 further comprising a prism member disposed between the objective and the photoelectric conventing member and having an output surface to which said filter member is cemented.

6. An optical low pass filter as in claim 1 wherein the phase grating is two-dimensional.

7. An optical low pass filter as in claim 1 wherein the respective sides of the triangular wave grating are asymmetrical.

8. In a phase grating type optical low pass filter for use in a single or double tube color television camera, the improvement comprising an optical low pass filter having a triangular-wave shape in cross section taken along at least one direction, the height, d, of the triangular wave being selected from a range given by the following formula:

$$\left|\frac{0.75\lambda}{2(n-n')}\right| \leq d \leq \left|\frac{1.45\lambda}{2(n-n')}\right|$$

wherein n is the refractive index of the filter material, n' is the refractive index of the medium bordering on the surface of the grating, and $\lambda$ is the wave length of the light affected by the filter.

9. An optical low pass filter as in claim 8 wherein each triangle in the triangular wave is symmetric.

10. An optical low pass filter as in claim 8 wherein the ratio K of widths of adjacent sides of the triangular wave is selected from a range given as follows:

$0.5 \leq K \leq 2.0$.

11. An optical low pass filter as in claim 8 wherein the filter is transparent, with the light to be affected passing therethrough.

12. An optical low pass filter as in claim 8 wherein surfaces of the triangular wave grating are coated with a light refractive material and the height, d, of the triangular wave is one-half the value of that set forth for a transparent filter material.

* * * * *